US010831352B2

(12) United States Patent
Cragun et al.

(10) Patent No.: US 10,831,352 B2
(45) Date of Patent: *Nov. 10, 2020

(54) GUIDED REMEDIATION OF ACCESSIBILITY AND USABILITY PROBLEMS IN USER INTERFACES

(71) Applicant: International Business Machines Corporation, Armonk, NY (US)

(72) Inventors: Brian J. Cragun, Rochester, MN (US); Puthukode G. Ramachandran, Austin, TX (US); Shunguo Yan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/370,235

(22) Filed: Mar. 29, 2019

(65) Prior Publication Data

US 2019/0227700 A1 Jul. 25, 2019

Related U.S. Application Data

(63) Continuation of application No. 14/452,087, filed on Aug. 5, 2014, now Pat. No. 10,324,596.

(51) Int. Cl.
*G06F 3/0484* (2013.01)
*G06F 11/36* (2006.01)
*G06F 3/048* (2013.01)

(52) U.S. Cl.
CPC .......... *G06F 3/04842* (2013.01); *G06F 3/048* (2013.01); *G06F 3/04847* (2013.01); *G06F 11/3668* (2013.01)

(58) Field of Classification Search
CPC .............. G06F 3/04842; G06F 3/04847; G06F 11/3668
USPC .................................. 715/707, 716, 729, 762
See application file for complete search history.

(56) References Cited

U.S. PATENT DOCUMENTS 9,772,682 B1 * 9/2017 Meenakshisundaram ...................
G06F 3/048
2010/0268809 A1 * 10/2010 Ganesh .................. G06Q 10/06
709/223
2011/0187651 A1 * 8/2011 Whitlow ................. G06F 3/041
345/173

(Continued)

OTHER PUBLICATIONS

List of All IBM Related Applications, Appendix P, 2019.

*Primary Examiner* — Christopher J Fibbi
(74) *Attorney, Agent, or Firm* — Garg Law Firm, PLLC; Rakesh Garg; Brian Welle

(57) ABSTRACT

A user interface is analyzed to identify a problem element in the user interface. A problem in the user interface is related to an initial value of an attribute of the problem element. A changed value of the attribute of the problem element is computed. A determination is made that the changed value satisfies a compliance rule applicable to the user interface. A first record and a second record are selected from a historical data. The first record includes a first value of a metric usable with the user interface, and the second record includes a second value of the metric. A difference between the second value and the first value is associated with the changed value as an expected change in the metric due to the changed value. The changed value and the expected change in the metric are presented as a remedy for the problem.

20 Claims, 5 Drawing Sheets

(56) References Cited

U.S. PATENT DOCUMENTS

2011/0214067 A1* 9/2011 Tanaka .................. G06F 40/174
  715/745
2012/0198365 A1* 8/2012 Bornheimer .............. G06F 8/38
  715/762
2013/0124532 A1* 5/2013 McQuarrie ........... G06F 40/226
  707/748

* cited by examiner

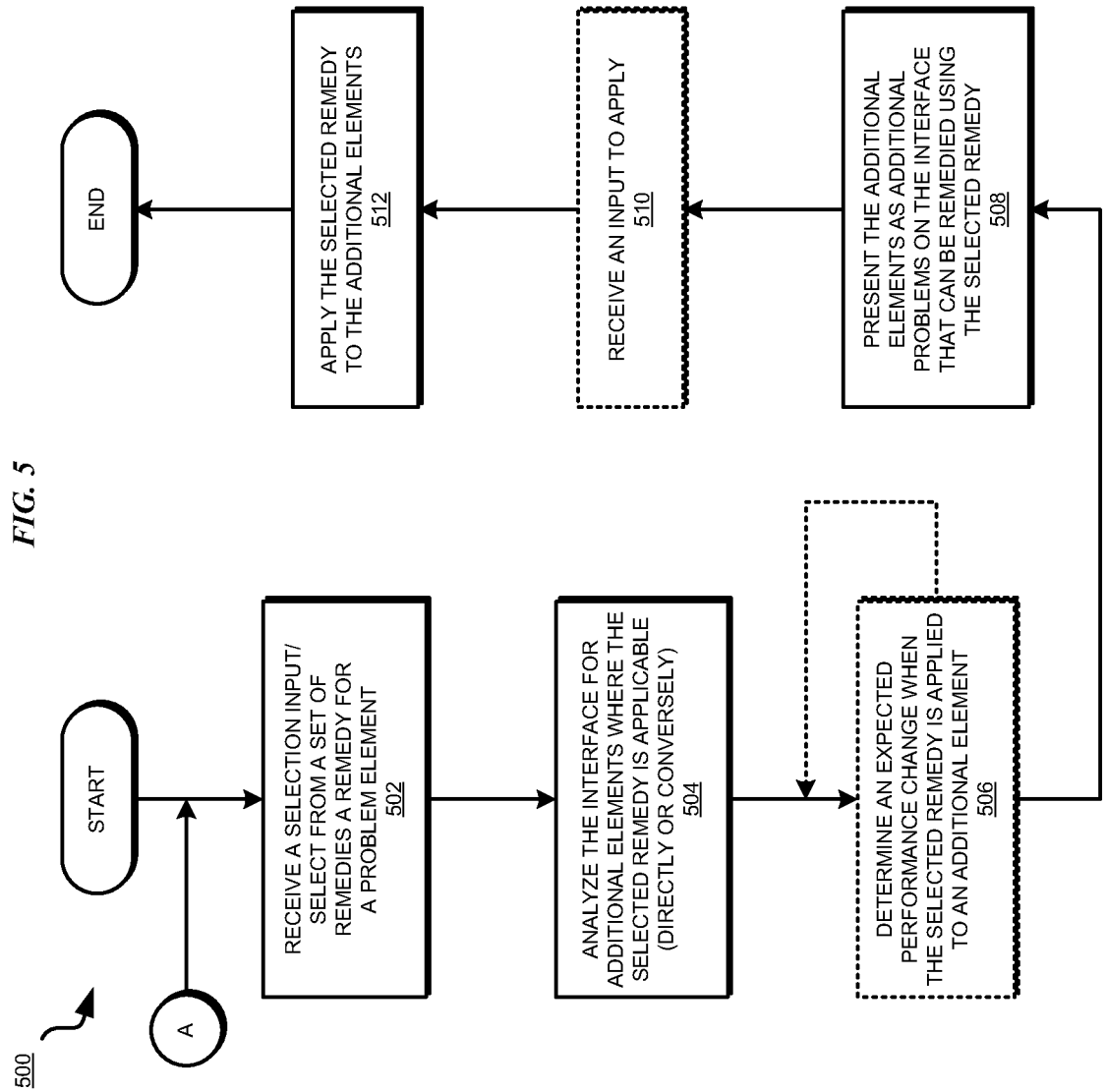

GUIDED REMEDIATION OF ACCESSIBILITY AND USABILITY PROBLEMS IN USER INTERFACES

TECHNICAL FIELD

The present invention relates generally to a method, system, and computer program product for evaluating the user interfaces used on computing devices. More particularly, the present invention relates to a method, system, and computer program product for guided remediation of accessibility and usability problems in user interfaces.

BACKGROUND

Almost all data processing systems, including mobile devices, include some manner of interacting with a user. For example, a display device is used with a data processing system for presenting a visual user interface to a user, an audio device is used with the data processing system for presenting audible user interface to the user, and tactile devices are used for presenting a touch-based interface to the user. Within the scope of the disclosure, the term "user interface" refers to a user interface of any of these types or other types as may be suitable for a particular implementation.

Accessibility features are features of a user interface that are designed or configured to assist a user in interacting with a particular aspect of the given user interface. For example, a large default font size is an example accessibility feature that makes interacting with a user interface easier for those users who have weak eyesight. Similarly, an audio readout accessibility feature assists users with vision impairment to interact with a user interface. A tactile feedback, such as vibration of a mobile device, is another example accessibility feature for users who have temporary, circumstantial, or permanent auditory impairment.

A usability feature is a feature of a user interface that is designed or configured to assist a user in interacting with a particular aspect of the given user interface under certain circumstance of usage. For example, a stationary user generally has better control on motor skills than a mobile user. Accordingly, small fonts are easily readable to the stationary user but not to a moving user. Light contrasts are similarly better perceived in evenly and moderately lit environments and high contrasts are better for sharp or bright lighting conditions. Similarly, accessibility features are useful not only for the users with certain impairments but also for users operating a user interface under different circumstances.

Many accessibility and usability features are presently available for use in user interface designs. Often, an application executing on a data processing system presents several user interfaces to the user during the course of using the application. For example, numerous user interfaces in the forms of screen layouts, plugin applications, and tools are presented or called upon during the course of a user using a software application.

SUMMARY

The illustrative embodiments provide a method, system, and computer program product for guided remediation of accessibility and usability problems in user interfaces. An embodiment includes a method for resolving a problem in a user interface. The embodiment analyzes the user interface to identify a problem element in the user interface, wherein the problem in the user interface is related to an initial value of an attribute of the problem element. The embodiment computes a changed value of the attribute of the problem element. The embodiment determines that the changed value satisfies a compliance rule applicable to the user interface. The embodiment selects a first record and a second record from a historical data, wherein the first record includes a first value of a metric usable with the user interface, and wherein the second record includes a second value of the metric. The embodiment associates, with the changed value, a difference between the second value and the first value as an expected change in the metric due to the changed value. The embodiment presents the changed value and the expected change in the metric as a remedy for the problem in the user interface.

Another embodiment includes a computer usable program product comprising a computer readable storage device including computer usable code for resolving a problem in a user interface. The embodiment further includes computer usable code for analyzing the user interface to identify a problem element in the user interface, wherein the problem in the user interface is related to an initial value of an attribute of the problem element. The embodiment further includes computer usable code for computing a changed value of the attribute of the problem element. The embodiment further includes computer usable code for determining that the changed value satisfies a compliance rule applicable to the user interface. The embodiment further includes computer usable code for selecting a first record and a second record from a historical data, wherein the first record includes a first value of a metric usable with the user interface, and wherein the second record includes a second value of the metric. The embodiment further includes computer usable code for associating, with the changed value, a difference between the second value and the first value as an expected change in the metric due to the changed value. The embodiment further includes computer usable code for presenting the changed value and the expected change in the metric as a remedy for the problem in the user interface.

Another embodiment includes a data processing system for resolving a problem in a user interface. The embodiment further includes a storage device including a storage medium, wherein the storage device stores computer usable program code. The embodiment further includes a processor, wherein the processor executes the computer usable program code. The embodiment further includes computer usable code for analyzing the user interface to identify a problem element in the user interface, wherein the problem in the user interface is related to an initial value of an attribute of the problem element. The embodiment further includes computer usable code for computing a changed value of the attribute of the problem element. The embodiment further includes computer usable code for determining that the changed value satisfies a compliance rule applicable to the user interface. The embodiment further includes computer usable code for selecting a first record and a second record from a historical data, wherein the first record includes a first value of a metric usable with the user interface, and wherein the second record includes a second value of the metric. The embodiment further includes computer usable code for associating, with the changed value, a difference between the second value and the first value as an expected change in the metric due to the changed value. The embodiment further includes computer usable code for presenting the changed value and the expected change in the metric as a remedy for the problem in the user interface.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a flowchart of another example process for guided remediation of accessibility and usability problems in user interfaces in accordance with an illustrative embodiment.

DETAILED DESCRIPTION

Figure 1:
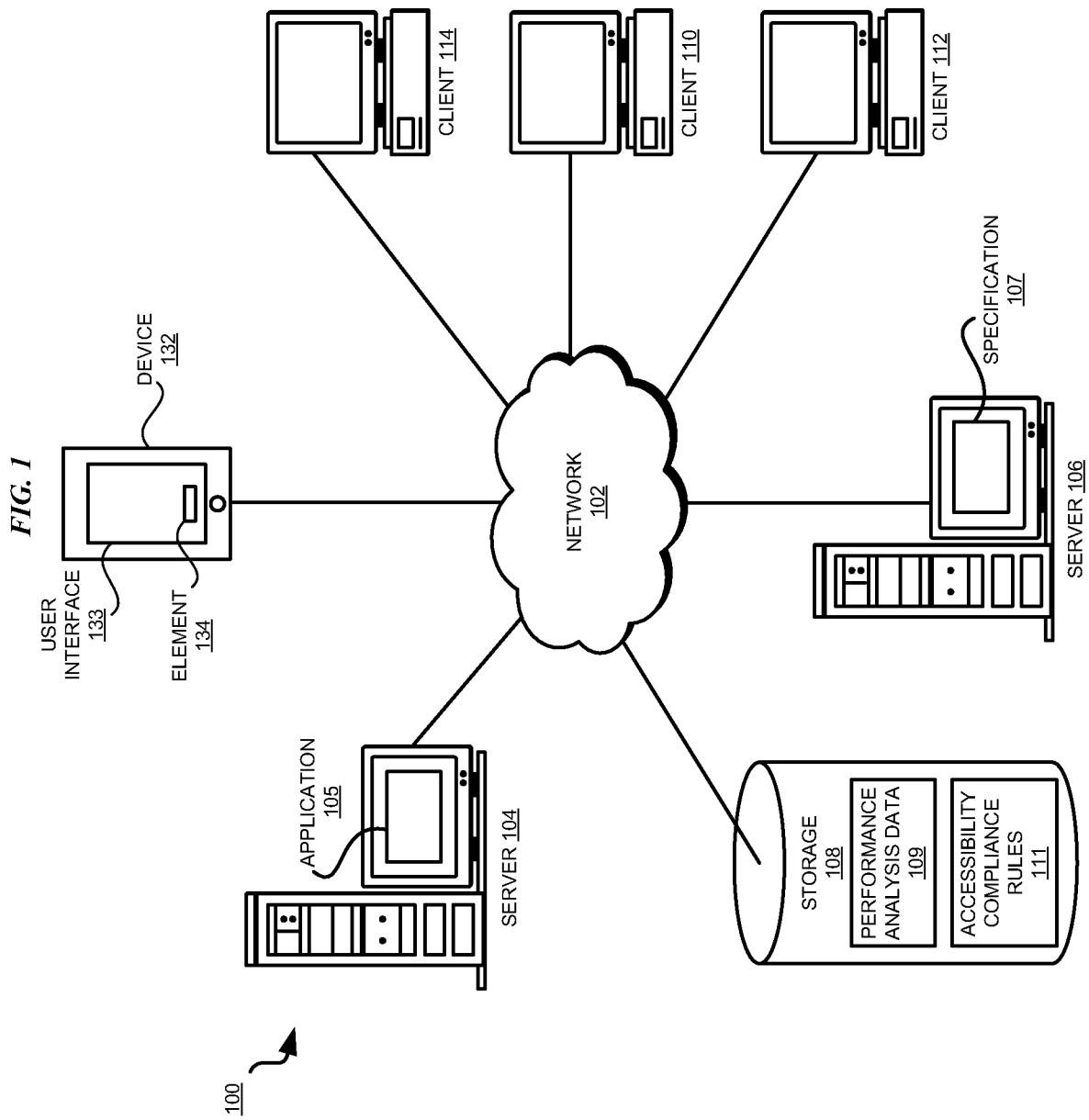
FIG. 1 depicts a block diagram of a network of data processing systems in which illustrative embodiments may be implemented.

Certain embodiments are described with respect to accessibility features only as examples and not to imply any limitation on the illustrative embodiments. An embodiment described with respect to an accessibility feature is similarly usable with respect to a usability feature within the scope of the illustrative embodiments. Any description or example using the term 'accessibility' is similarly applicable to usability aspects of a user interface in a similar manner, and vice versa.

The illustrative embodiments recognize accessibility features of a user interface are largely implementation dependent, and therefore are decided by software manufacturers and software developers. Standards and specifications for some accessibility features presently exist, with new accessibility features and their specifications evolving with the advancement of technology.

Presently, tools are available for testing a user interface for accessibility or usability. For example, some software manufacturers include accessibility testing as a part of software testing activity and include an accessibility compliance report generated therefrom with the software. Some other software products are distributed with manufacturer-supplied accessibility testing tools bundled with the software.

The illustrative embodiments recognize that by using a testing tool or simply by using a user interface under certain ambient conditions, user impairments, or both, an accessibility or usability problem can be identified in a user interface. Once an accessibility or usability problem in a user interface (problem) is identified, the problem has to be corrected.

For example, assume that an element of the user interface is the source of a problem. The illustrative embodiments recognize that in some cases, remedying the problem is as simple as applying a description to the problem element either programmatically or through configuration of the user interface. Image text and button description are some examples of such remedies. However, in some other cases, remedying a problem can be more complicated.

For example, a user, such as a developer of the user interface, may not be familiar with a specific accessibility or usability guideline. When the user attempts to remedy one problem, the remedy might inadvertently create or exacerbate another problem in the user interface or elsewhere in the application.

As another example, different approaches may exist to remedying the same problem, but with different end-results or consequences. For example, a color contrast problem may be related to background and foreground color of the element or the text surrounding the element, but may also be related to the color harmonies or transitions to the surrounding elements or widgets on the user interface. Thus, changing the color contrast of a problem button may solve the problem for the button element but disturb a color transition to another element surrounding the button element.

As another example, a button size problem may arise due to a smaller than desired size of the button. But, the button size problem may be related to the widget spacing and distribution on the user interface screen as well as to the screen size. Simply increasing the size of the button element may therefore cause other design issues for the user interface, such as crowding other text, or forcing fields to appear further down on the dialog and require scrolling.

The illustrative embodiments further recognize that different remedies to a problem may have different effects on the human performance of the user interface (performance). For example, tap accuracy, relative reading rate, time spent on locating and touching a target element on a user interface are some example performance metrics of the user interface. Some known user interface performance analytic studies recognize that the tap accuracy is a function of the size of the interactive element, e.g., a button, distance between two or more elements, color contrast, character size of text, or a combination thereof, on a user interface. Some known user interface performance analytic studies recognize that the reading rate is a function of the color contrast and character size of text on a user interface. Therefore, the selection and use of certain colors, contrast values (lightness or darkness irrespective of color), or both, can influence the performance of a user interface. The illustrative embodiments recognize that changing a characteristic of a problem element can therefore have a favorable or unfavorable effect on the performance of the user interface.

The illustrative embodiments further recognize that a remedy for a problem has to also conform to any style guidelines, expected user impairments or usage circumstances, accessibility or usability compliance rules, and aesthetic and functional specifications applicable to the user interface. For example, consistency in the styles of a user interface is an important cognitive clue for user. A remedy that introduces inconsistent styles may result in confusion and a slower interaction with the user interface. Therefore, any single remedy should not generally be undertaken without taking into consideration the effect of the remedy on rest of the user interface.

Therefore, the illustrative embodiments recognize that a remediation guidance system would be useful in identifying actual or potential problems with a user interface, providing a set of one or more remediation alternatives for a problem, and predicting performance effects of the various remedies. These and other features of such a system would give developers and user interface designers better understanding and control during a user interface problem remediation process.

The illustrative embodiments used to describe the invention generally address and solve the above-described problems and other problems related to solving accessibility or usability problems in user interfaces. The illustrative embodiments provide a method, system, and computer program product for guided remediation of accessibility and usability problems in user interfaces.

An embodiment identifies, or receives information about an accessibility or usability problem with a user interface. One embodiment also receives an interface description that describes the elements of the user interface. Another embodiment receives instead of, or in addition to, the interface description, a structure of the elements in the page, e.g., an element hierarchy.

Using the interface description, the element structure, or both, an embodiment identifies the relationships, dependencies, and restrictions of the problem element relative to the other elements of the interface. An embodiment further uses a set of compliance rules, e.g., accessibility compliance rules, specifications, or other similarly purposed guidelines to compute a remedy for the problem element.

An embodiment can test the effectiveness of a remedy in a variety of ways. For example, a repository may be able to supply performance data for similar remedies applied to similar problems in other interfaces. Using such data, one embodiment can evaluate a remedy for expected performance improvements. As another example, a repository may be able to supply user feedback or survey results for similar remedies applied to similar problems in other interfaces. Using such data, one embodiment can evaluate a remedy for expected user response to the remedy.

As another example, a repository may be able to supply effectiveness (e.g., above or below a threshold effectiveness) of similar remedies applied to similar problems in other interfaces when used by users with different disabilities. Using such data, one embodiment can evaluate a remedy for expected effectiveness of the remedy for particular disabilities. As another example, a repository may be able to supply effectiveness (e.g., above or below a threshold effectiveness) of similar remedies applied to similar problems in other interfaces when used by users under different usage conditions or circumstances. Using such data, one embodiment can evaluate a remedy for expected effectiveness of the remedy under particular usage conditions. As another example, a repository may be able to supply task completion delays for similar remedies applied to similar problems in other interfaces. Using such data, one embodiment can evaluate a remedy for expected effect on a problem that prevents or delays task completion.

These example evaluation factors for evaluating a remedy are described only as examples and not to imply a limitation on the illustrative embodiments. From this disclosure, those of ordinary skill in the art will be able to conceive many other evaluation factors and corresponding repositories, and the same are contemplated within the scope of the illustrative embodiments.

To further illustrate the operation of an embodiment, assume that one embodiment evaluates a remedy for performance improvement. Only as an example and without implying a limitation to performance factors based evaluation of remedies, the example embodiment further performs a performance analysis of the remedy to determine the remedy's effect on one or more performance metrics associated with eth user interface. For example, an embodiment uses historical performance analysis data for the performance analysis of the remedy.

Historical performance analysis data comprises data from past usage of all or part of a given user interface, which documents a contribution for a performance metric, a contribution of an element to the metric, a contribution of a set of elements to the metric, a total value of the metric for the entire interface, or some combination thereof. For example, a manufacturer of an application that includes the user interface may perform tests on the user interface to generate a portion of the historical performance analysis data. As another example, an organization or an application, e.g., a compliance verification committee or a compliance verification application, may perform tests on the user interface to generate all or a portion of the historical performance analysis data.

As another example, users of an application that includes the user interface may contribute data to the historical performance analysis data by allowing the application to measure the accessibility or usability of all or portions of the user interface while the users use the application. As another example, users of an application that includes the user interface may contribute data to the historical performance analysis data by providing accessibility or usability feedback.

Furthermore, the historical performance analysis data need not be application-centric or for a single user interface. For example, when several user interfaces of one or more applications use similar elements therein to facilitate accessibility or usability, the data about a performance metric of such elements and user interfaces can be collectively used in the historical performance analysis data as well.

An embodiment determines a change in a performance metric of a user interface when a particular remedy is applied to resolve a particular problem. Furthermore, depending upon the nature of the problem or the element in question, an embodiment may produce more than one possible remedy to resolve the problem. Potentially, each such remedy can have an impact on a performance metric. The embodiment analyzes the performance impact of each remedy to guide the developer.

Given multiple remedies for a problem, an embodiment provides further guidance by ranking the various remedies. A rank or weight associated with a remedy can depend on one or more considerations. For example, one embodiment ranks the remedies according to the relative performance improvements expected from each remedy. For example, the remedy providing the highest performance improvement in one or more performance metric is ranked the highest, followed by remedies of progressively lower performance improvements.

The historical performance data can be replaced with any other suitable historical data, data collection, or repository pertaining to other evaluating factors as described earlier. For example, another example embodiment ranks the remedies according to the type of disability or impairment in the description of the problem that is addressed by a remedy. For example, a problem may have two remedies, one remedy, e.g., higher contrast font color, being more effective for visually impaired users and another remedy, e.g., larger font size, being more effective for non-stationary users. If the problem being resolved is related to visually impaired users, the first remedy is ranked higher than the second user. If the problem being resolved is related to non-stationary users, the second remedy is ranked higher than the first user.

Another example embodiment ranks the remedies according to the degree of other problems or violations created by a remedy in the user interface. For example, under certain circumstances, resolving a problem may not be possible without creating additional problems, worsening another problem, violating a rule or specification, or some combination thereof. The embodiment ranks the remedy that creates a minimum amount of such problems or violations the highest, followed by remedies that create progressively larger amounts of problems or violations.

These example manners of ranking various possible remedies are not intended to be limiting on the illustrative embodiments. From this disclosure, those of ordinary skill in the art will be able to conceive other manners of ranking competing remedies for resolving an accessibility or usability problem on a user interface, and the same are contemplated within the scope of the illustrative embodiments.

An embodiment guides a developer by presenting the various remedy options to the developer along with the performance changes caused by those remedies, rankings associated with those remedies, or some combination thereof. The developer can then choose to apply one of the remedies to resolve the problem and generally improve the accessibility or usability of the user interface.

An embodiment receives the developer's selection of the remedy. Based on the selected remedy, the embodiment further analyzes the user interface to identify other elements or sets of elements where a similar remedy is applicable. For example, if the selected remedy is to change a font size in one element of the user interface, the embodiment analyzes additional elements of same or different types in the user interface to determine whether a change in font size at such additional elements might further improve a performance metric, resolve a known problem, resolve a potential problem, or a combination thereof.

As another example, if the selected remedy is to change a present color scheme to a new color scheme in one element of the user interface, the embodiment analyzes additional elements where the same present color scheme or an inverse of the present color scheme is in use. The embodiment determines if the new color scheme or an inverse of the new color scheme might further improve a performance metric, resolve a known problem, resolve a potential problem, or a combination thereof.

An embodiment can similarly analyze additional elements for contrast changes, font size changes, font color changes, color scheme or palette changes, element sizing changes, element positioning changes, orientation changes, and other applicable changes as remedies. Furthermore, an embodiment can analyze different elements for different variants of a given remedy. For example, when the embodiment changes a problem element's contrast to a new level as a remedy, the embodiment analyzes an additional element to change the additional element's contrast to a different new level. As another example, example, when the embodiment changes a problem element's color scheme to a new scheme as a remedy, the embodiment analyzes an additional element to change the additional element's color scheme to a different new scheme, including but not limited to an inverse of the new color scheme. As another example, when the embodiment changes a problem element's font characteristic to a new value as a remedy, the embodiment analyzes an additional element to change the same font characteristic of the additional element to a different new value.

In one embodiment, the developer can elect to apply the remedy to the additional elements. In another embodiment, the remedy is automatically applied to such additional elements. Regardless of how the determination to apply a remedy to additional elements is made, an embodiment applies the remedy or a variant thereof to all or a subset of the additional elements.

The illustrative embodiments are described with respect to certain user interfaces, elements, accessibility features, usability features, historical data, repositories, evaluating factors, ranking factors, performance metrics, problems, remedies, specifications, rules, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
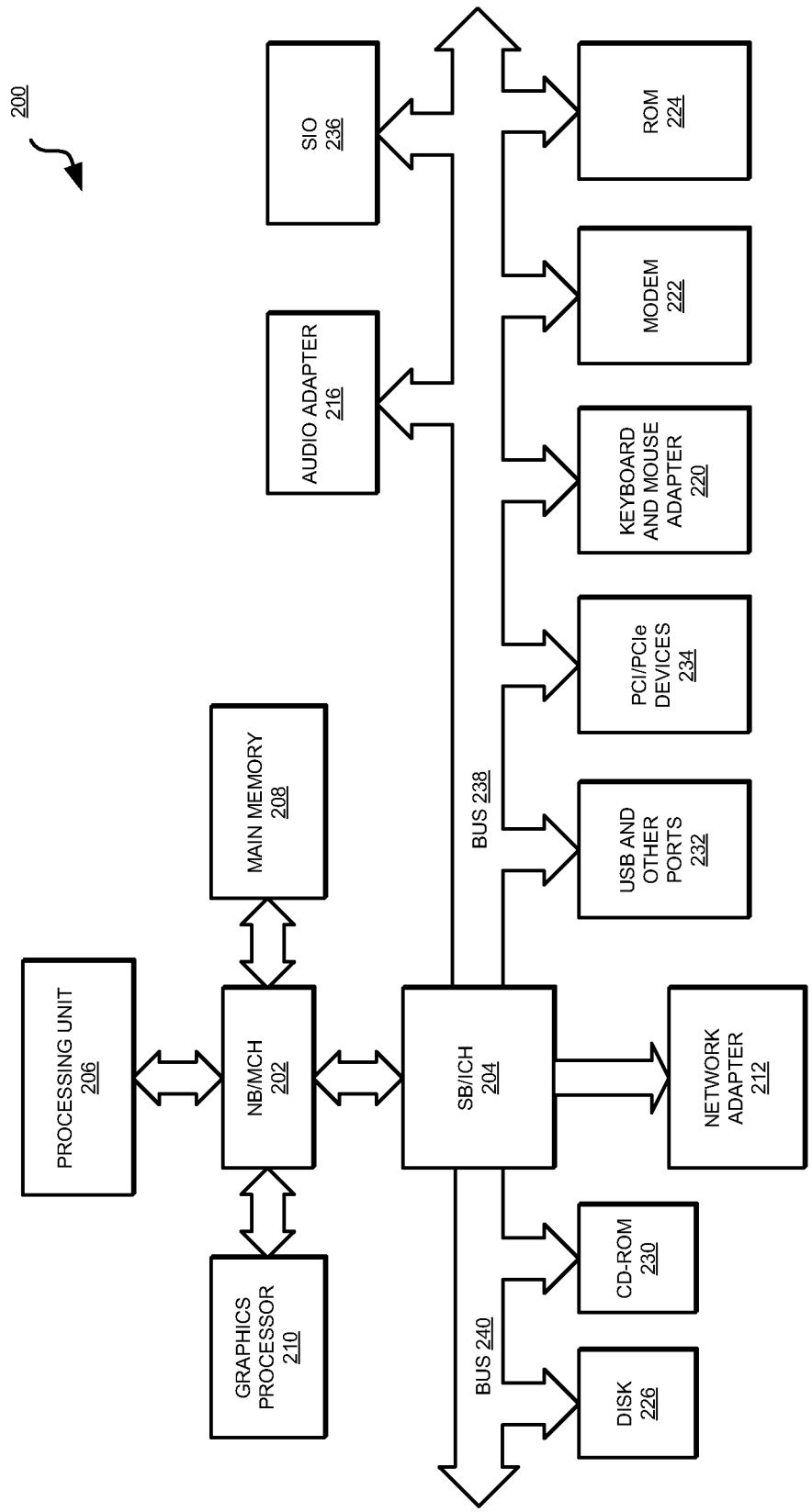
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Device 132 is a mobile device. User interface 133 is an example user interface including one or more elements, such as element 134. A problem relative to element 134 can be remedied using an embodiment described herein. Application 105 implements an embodiment described herein. Specification 107 governs the implementation of 133 user interface, such as by specifying an accessibility or usability condition that user interface 133 or element 134 should not violate. Performance analysis data 109 includes historical performance analysis data as described herein. Accessibility compliance rules (rules) 111 include any rule or policy that user interface 133, element 134, or both, must satisfy to be accessibility compliant, usability complaint, or both.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of a device, such as device 132 in FIG. 1 in which computer usable program code or instructions implementing the processes of the illustrative embodiments may be located. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105, user interface 133, and rules 111 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Depending upon the particular implementation of data processing system 200, data processing system 200 may further include or communicate with a display device, such as a monitor, a screen element, or a touch-screen interface. Data processing system 200 may accept inputs in a variety of other forms besides the example inputs described above. For example, a touch-screen can provide an input in the manner of a keyboard or a mouse pointing device, non-touch gesture input devices that detect a user's motions can similarly provide input to data processing system 200. A biometric sensor, a camera, or an eye motion sensor can provide visual input and analytical information such as facial recognition and other biometric information. A microphone can provide audio input such as for voice recognition services. A variety of input devices and human-machine interface devices can provide other types of inputs such as gesture services, motion services (e.g., Global Positioning System based motion detection. Any type of input and output can be integrated into a user interface design, and the same are contemplated within the scope of the illustrative embodiments.

Figure 3:
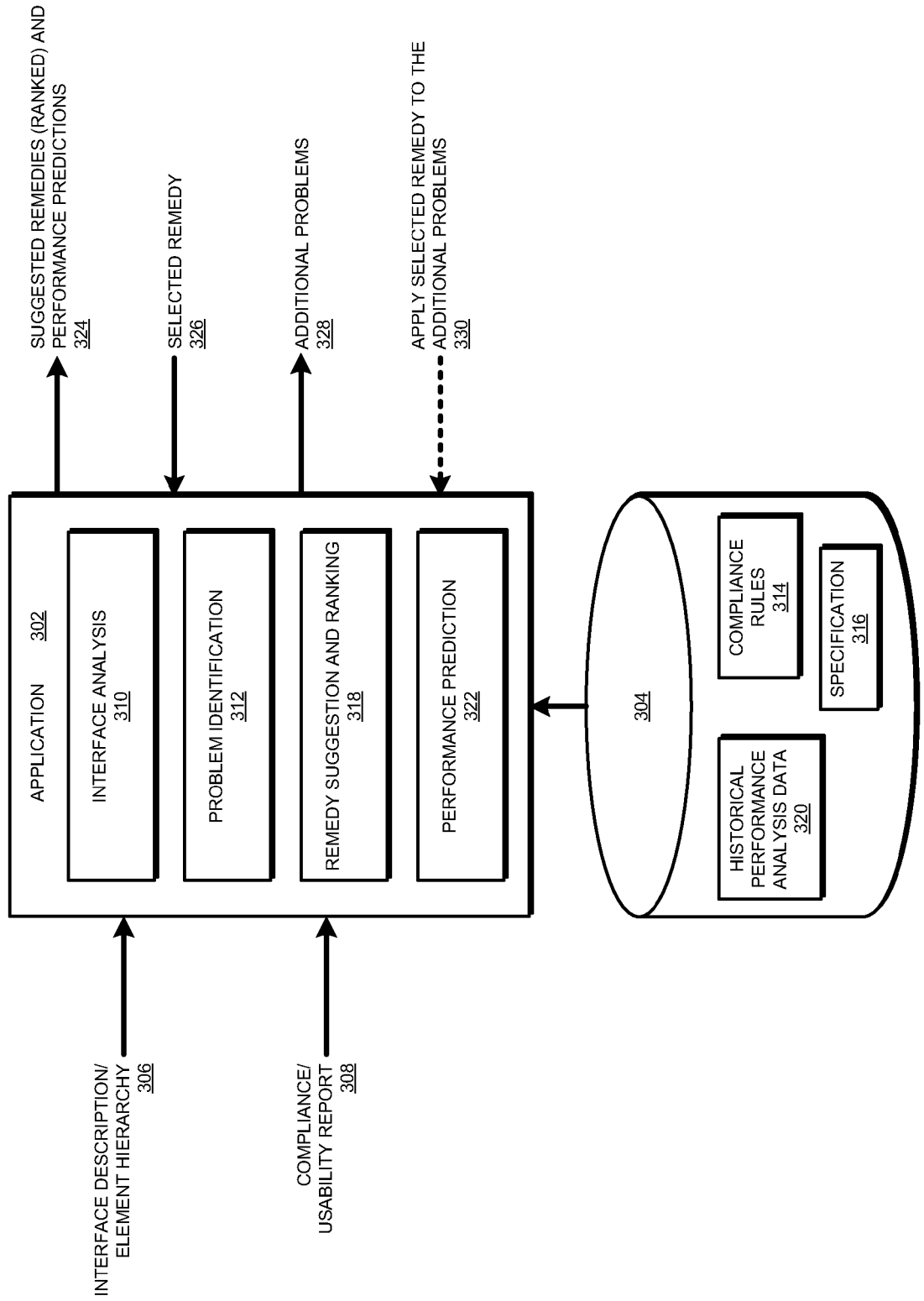
FIG. 3 depicts a block diagram of a configuration for guided remediation of accessibility and usability problems in user interfaces in accordance with an illustrative embodiment.

With reference to FIG. 3, this figure depicts a block diagram of a configuration for guided remediation of accessibility and usability problems in user interfaces in accordance with an illustrative embodiment. Application 302 is an example of application 105 in FIG. 1. Repository 304 comprises one or more data storage devices or systems, such as but not limited to storage 108 in FIG. 1, a storage device in data processing system 106, a storage system accessible from data processing system 104 over network 102 in FIG. 1.

Interface description 306 comprises information sufficient to identify the elements used in a user interface, e.g., element 134 in user interface 133 in FIG. 1, and to determine a relationship, a dependency, a restriction, a condition, and other similarly purposed information relative to such interface and elements. In one embodiment, interface information 306 comprises an organization of the elements used in a user interface, e.g., a hierarchy of such elements. In another embodiment, interface description also contains information about accessibility, usability, and other attributes of the element. Such information is extracted from a data structure of the interface. The interface description can be further used by a compliance and performance evaluation engine to evaluate the compliance of the interface, based on certain rules, guidelines or formulae, to produce a report that can be used in, or as, report 308.

Interface description 306 forms an input to application 302. Interface description 306 may be supplied to application 302, or application 302 may access interface description 306 from a data processing system over a data network.

Report 308 is any suitable manner of providing information about the compliance or non-compliance of a user interface or an element therein. For example, report 308 can be an accessibility compliance report, which identifies element 134 in user interface 133 of FIG. 1 as being out of compliance with an accessibility rule or specification, and therefore being a problem element. Report 308 is an optional input to application 302. When available, report 308 provides a problem description to application 302. When report 308 is not available, application 302 identifies an accessibility or usability problem by other methods.

For example, component 310 performs an analysis of the user interface using interface description 306. The analysis performed by component 310 identifies a set of accessibility related elements in the user interface. For example, if an element used in a user interface described by interface description 306 has an attribute that is adjustable for accessibility, component 310 identifies that element as an accessibility related element. When interface description 306 includes an element hierarchy, the container nodes or element nodes in the hierarchy include information usable for identifying an element as an accessibility related element.

Component 312 identifies one or more elements that are related to an accessibility problem in a user interface of interface description 306. In one embodiment, when report 308 is available, component 312 identifies the noncompliant element in report 308. Otherwise, or in addition to the availability of report 308, component 312 identifies one or more elements that are problematic, to wit, related to an accessibility problem, e.g., by identifying those elements that do not comply with one or more compliance rules 314, specification 316, or a combination thereof.

For a problem element, component 318 determines a remedy for the problem. As one example of determining or computing a remedy, component 318 determines an amount by which an attribute or characteristic of the problem element is noncompliant according to one or more rules 314, specification 316, or a combination thereof. For example, if a specification specifies a button width of at least 44 pixels for accessibility for visually impaired users, and the element is a button only 30 pixels wide, component 318 computes 14 pixel widening as a part of a remedy. If the 14 pixel widening does not violate a rule in rules 314, a condition in specification 316, or a combination thereof, component 318 determines the widening by 14 pixels as a remedy for the problem element.

As another example of determining or computing a remedy, component 318 determines a difference between a value of an attribute or characteristic of the problem element and a value of a comparable attribute or characteristic of a comparable element for which performance data is available in historical performance analysis data 320. For example, assume that data 320 indicates a higher than threshold value for 'viewability' performance metric for bright ambient conditions when the contrast is at x percent. Further assume that the element is a text area with contrast set to y (where y is less than x).

Component 318 computes (x−y) increase in the contrast of the problem element as a part of a remedy. If the change in the contrast does not violate a rule in rules 314, a condition in specification 316, or a combination thereof, component 318 determines the increase in the contrast by (x−y) value as a remedy for the problem element.

As another example of determining or computing a remedy, assume that data 320 indicates that images in a certain area of a user interface when associated with a descriptive image text have a higher than threshold value for 'navigation speed' performance metric for users with certain cognitive disabilities. Further assume that the element is an image in a comparable area of the user interface of interface description 306 but does not have an image text associated therewith or has a non-descriptive text associated therewith. An example of a non-descriptive image text is an alphanumeric code, such as a filename or path, instead of a description of the contents of the image.

Component 318 computes a suitably descriptive text for the image as a part of a remedy. For example, component 318 can use an image recognition application (not shown) to identify objects, persons, or places in the image, and describe them in the descriptive text. If the descriptive text does not violate a rule in rules 314, a condition in specification 316, or a combination thereof, component 318 determines the descriptive text as a remedy for the problem element.

These example manners of computing remedies are described only for the clarity of the description and are not intended to be limiting on the illustrative embodiments. Many other ways of remedying these and other accessibility or usability problems associated with user interface elements will become apparent from this disclosure and the same are contemplated within the scope of the illustrative embodiments.

Component 318 ranks the one or more remedies determined for the problem element using any of the example methods described herein, or other similarly purposed methods. When the ranking is based on the performance change contributed by a remedy, component 318 uses the performance predictions produced by component 322.

Component 322 predicts a performance change from a remedy determined by component 318. Some historical performance analysis data in data 320 pertains to an element that is comparable to the problem element. Component 322 searches such data 320 for a first performance value of a performance metric where an attribute value of the comparable element matches the comparable attribute value of the problem element within a threshold. Component 322 further searches such data 320 for a second performance value of the performance metric where the attribute value of the comparable element matches the remedied value of the comparable attribute of the problem element within a threshold. Component 322 computes a performance change between the first performance value and the second performance value, and associates the performance change with the remedy.

For example, suppose that the problem element is a text input box and a remedy changes a font size from 10 points to 12 points for the text input box. Assume that one record in data 320 shows a performance value of 49 example units for an input accuracy metric when a 10-point font used in a text area element. Assume that another record in data 320 shows a performance value of 76 example units for the input accuracy metric when a 12-point font used in the text area element. Accordingly, component 322 determines that by changing the font size from 10 to 12 at the problem text input box element a performance change (improvement) of 27 example units can be expected.

These example manners of predicting expected performance changes are described only for the clarity of the description and are not intended to be limiting on the illustrative embodiments. Many other ways of manners of predicting expected performance changes will become apparent from this disclosure and the same are contemplated within the scope of the illustrative embodiments.

Application 302 outputs suggestions 324. Suggestions 324 include one or more suggested remedies for a problem element. In one embodiment, the suggested remedies are ranked. In another embodiment, the suggested remedies have corresponding performance change predictions. In another embodiment, the suggested remedies have ranking and performance predictions associated therewith.

In one embodiment, a user, e.g., a developer, optionally provides input 326 to select a remedy from suggestions 324. In another embodiment, input 326 is absent and application 302 selects a remedy from suggestions 324. For example, and without implying a limitation thereto, application 302 selects the remedy that is ranked the highest for a given user disability, usage circumstances, or otherwise.

Application 302 applies the selected remedy to the corresponding problem element. Furthermore, component 312 uses the suggested remedy as additional guideline for finding additional elements where the remedy might be applicable.

For example, if the selected remedy changes the font in the problem element from 10 point size to 12 point size in an input box, component 312 finds other elements in the user interface of interface description 306 where a text box, field, or area uses less than 12-point font. Component 312 designates such additional elements as potentially problematic, which can be remedied using the selected remedy.

In one embodiment, application 302 outputs list 328. List 328 includes the additional elements identified as potentially problematic and resolvable using the selected remedy.

In one embodiment, a user, e.g., a developer, optionally provides input 330 to apply the selected remedy to one or more additional elements from list 328. In another embodiment, input 330 is absent and application 302 selects automatically applies the selected remedy to all or some of the additional elements in list 328.

Figure 4:
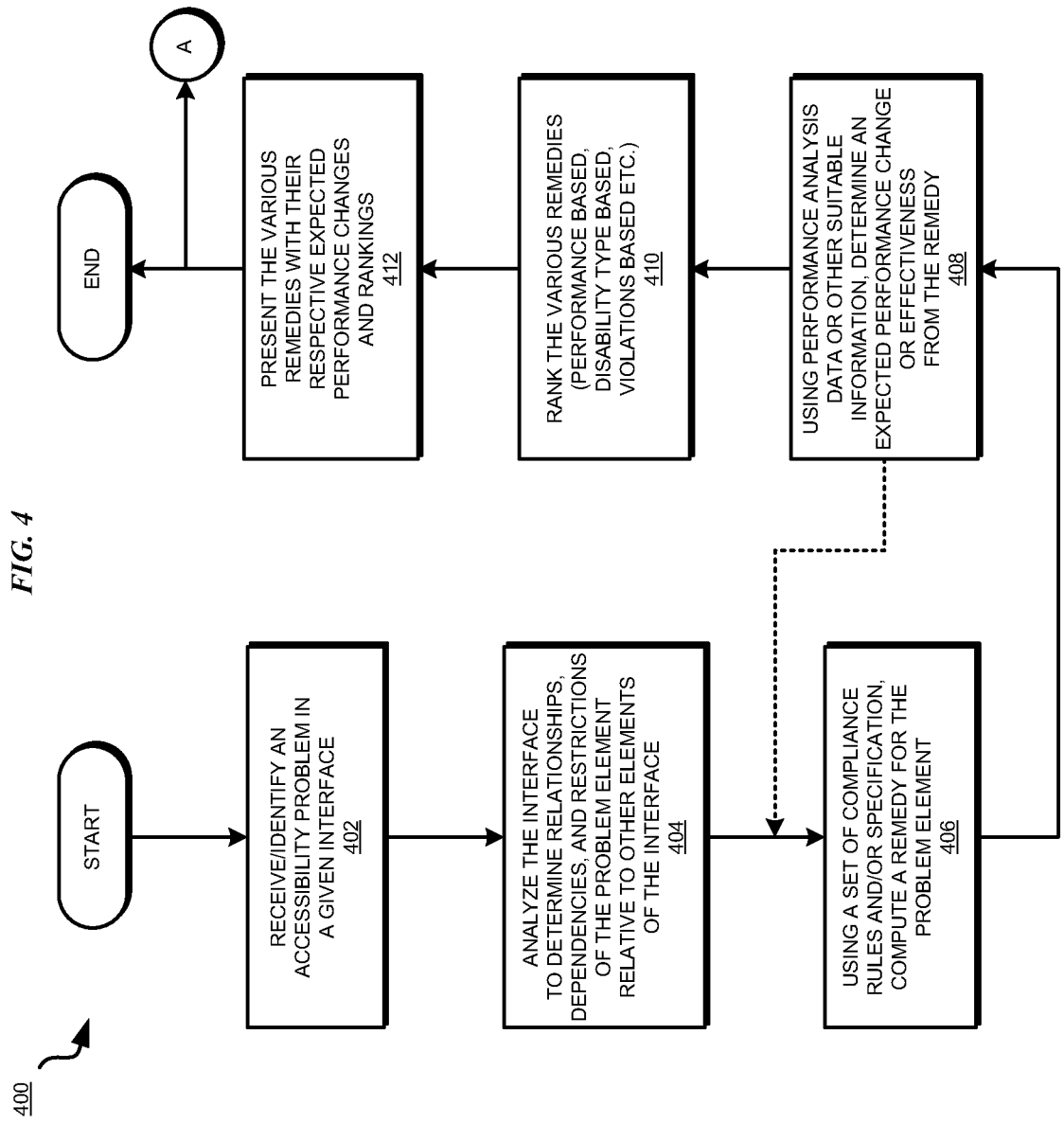
FIG. 4 depicts a flowchart of an example process for guided remediation of accessibility and usability problems in user interfaces in accordance with an illustrative embodiment.

With reference to FIG. 4, this figure depicts a flowchart of an example process for guided remediation of accessibility and usability problems in user interfaces in accordance with an illustrative embodiment. Process 400 can be implemented in application 302 in FIG. 3.

The application receives information about, or otherwise identifies an accessibility (or usability) problem in a given user interface (block 402). For a problem element associated with the problem, the application analyzes the user interface to determine relationships, dependencies, restrictions, and the like relative to other elements in the user interface (block 404).

Using a set of compliance rules, user interface specification, or a combination of these and other similarly purposed conditions on the user interface, the application computes a remedy for the problem element (block 406). Using performance analysis data, the application determines an expected performance change from the remedy (block 408). The application repeats blocks 406 and 408 as many times as needed to determine several alternative remedy options when possible.

When multiple remedies are available, the application can present the several remedies with relative rankings based on their relative actual or potential impact on the interface performance. Accordingly, the application ranks the various remedies using one or more ranking criteria alone or in combination (block 410). For example, the application can rank more than one alternative remedies according to their relative performance changes, according to the types of disability or usage circumstance of the problem, the amount of violations or other problems caused by a remedy, any other suitable criteria, or some combination thereof.

For example, suppose that a problem prevents a task completion on the interface if not remedied. The application reports several ranked remedies, where when the problem is remedied using one remedy, the problem task is completed but the remedy prevents a different task completion, or when using other remedies, the problem task is completed but with different amounts of delays or other consequences depending upon the factors used to evaluate the various remedies.

To guide a developer in resolving the accessibility or usability problem of the user interface, the application presents the various remedies with their respective expected performance changes and rankings (block 412). The application ends process 400 thereafter, or exits process 400 via exit point marked "A" to enter another process, such as process 500 in FIG. 5.

While the processes of FIGS. 4 and 5 are described with respect to using performance data to identify and rank remedies, the performance factors and performance data are not intended to be limiting on the illustrative embodiments. For example, in another embodiment (not depicted in the figures), after an initial remedy determines a new value of a parameter or attribute, the embodiment applies the new value to the interface description of the interface being remedied, such as interface description 306 in FIG. 3. As described with respect to FIG. 3, the application uses the revised interface description to evaluate the interface with the initial remedy applied. Thus, the application further determines the potential impact of the remedy on the entire revised interface.

If the remedy actually causes, or can potentially cause, new problems in the interface, then the remedy is recalculated following the steps in FIG. 4 based on the additional conditions that help avoid or mitigate the new problems. Additionally, when multiple remedies are available, factors other than performance, or in addition to performance can be used in the ranking process. For example, one embodiment uses user feedback about the same or similar changes on similar interfaces to determine a ranking of a remedy. Another embodiment determines the effectiveness of the remedy for one or more disability types, and ranks various remedies according the their relative effectiveness.

Another example embodiment determines the effectiveness of a remedy in a given set of expected usage scenarios, and ranks the various remedies according to their relative effectiveness in some or all of those scenarios. Another embodiment uses some combination of the performance estimation, user feedback, effectiveness under different user or usage circumstances, and other similarly purposed considerations to rank the various remedies, and optionally to select one of the remedies over another in the ranking.

With reference to FIG. 5, this figure depicts a flowchart of another example process for guided remediation of accessibility and usability problems in user interfaces in accordance with an illustrative embodiment. Process 500 can be implemented in application 302 in FIG. 3.

The application begins, or enters at entry point marked "A", by receiving a selection input to select, or otherwise selecting, a remedy from a set of remedies for a problem element (block 502). The application analyzes the user interface for additional elements where the selected remedy is applicable (block 504). For example, the application identifies those additional elements where the selected remedy, an inverse of the selected remedy, or another variant of the selected remedy is applicable in the manner described elsewhere in this disclosure.

Optionally, the application determines an expected performance change or effectiveness in solving a given problem under a given set of user or usage circumstances, when the selected remedy or a variant thereof is applied to an additional element (block 506). The application repeats block 506 for any number of such additional elements. For example, as described with respect to FIG. 4, the application can determine whether the remedy is effective according to user feedback, effective in problem task completion, effective to a given degree when assisting users with certain disabilities, effective to a given degree when assisting users under certain usage circumstances, and so on.

The application presents the additional elements as additional problems on the interface that can be remedied using the selected remedy or a variant thereof (block 508). Optionally, the application receives an input to apply the selected remedy or a variant thereof to one or more such additional elements (block 510).

The application applies the selected remedy or a variant thereof to one or more additional elements (block 512). The application ends process 500 thereafter.

Thus, a computer implemented method, system or apparatus, and computer program product are provided in the illustrative embodiments for guided remediation of accessibility and usability problems in user interfaces. Any step or operation of an embodiment described with respect to an accessibility issue is similarly usable with a usability issue within the scope of the illustrative embodiments. Any step or operation of an embodiment described with respect to a performance metric or value is similarly usable with any other measurement of acceptability, conformity, effectiveness, or desirability in a similar manner within the scope of the illustrative embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for resolving a problem in a user interface, the method comprising:

analyzing the user interface to identify a problem element in the user interface, wherein the problem in the user interface is related to an initial value of an attribute of the problem element;

computing, using a processor and a memory, a changed value of the attribute of the problem element;

determining that the changed value satisfies a compliance rule applicable to the user interface;

selecting a first record and a second record from a historical data, wherein the first record includes a first value of a metric usable with the user interface, and wherein the second record includes a second value of the metric;

associating, with the changed value, a difference between the second value and the first value as an expected change in the metric due to the changed value;

presenting the changed value and the expected change in the metric as a remedy for the problem in the user interface, wherein the expected change includes a change in an input accuracy metric when the remedy is applied to the problem element; and applying, responsive to receiving an instruction to apply the remedy to the problem element, the changed value of the attribute as the remedy to the problem element.

2. The method of claim 1, further comprising:
determining that the problem in the user interface is related to a second initial value of a second attribute of the problem element;
computing a second changed value of the second attribute of the problem element;
determining that the second changed value satisfies a second compliance rule applicable to the user interface;
associating, with the second changed value, a second expected change in the metric due to the second changed value; and
presenting the second changed value and the second expected change in the metric as a second remedy for the problem in the user interface.

3. The method of claim 2, further comprising:
ranking the remedy and the second remedy, wherein when the expected change in the metric is greater than the second expected change in the metric, the remedy is ranked higher than the second remedy.

4. The method of claim 2, further comprising:
ranking the remedy higher than the second remedy responsive to determining that the remedy is related to a user impairment aspect of the problem and determining that the second remedy is related to another aspect of the problem.

5. The method of claim 2, further comprising:
ranking the second remedy higher than the remedy responsive to determining that the second remedy is related to a usage condition aspect of the problem and determining that the remedy is related to another aspect of the problem.

6. The method of claim 2, further comprising:
selecting the remedy from the remedy and the second remedy; and
applying the remedy to the problem element to resolve the problem.

7. The method of claim 1, further comprising:
determining that the remedy is applicable to an additional element in the user interface; and
applying the remedy to the additional element to resolve a potential second problem due to the additional element.

8. The method of claim 1, further comprising:
identifying that the first record is associated with a first element, wherein the first element is comparable with the problem element, and wherein the first element comprises a first attribute having a first value, the first value being within a tolerance of the initial value of the attribute of the problem element; and
identifying that the second record is associated with a second element, wherein the second element is comparable with the problem element, and wherein the second element comprises a second attribute having a second value, the second value being within a second tolerance of the changed value of the attribute of the problem element.

9. The method of claim 1, further comprising:
selecting a third record from the historical data, wherein the third record is associated with a third element, the third element being comparable with the problem element, and wherein the third record comprises a third attribute having a third value;
determining that the third record does not indicate the problem relative to the third element; and selecting the changed value using the third value and a threshold.

10. The method of claim 1, further comprising:
computing a third value of the attribute of the problem element;
determining that the third value does not satisfy at least one compliance rule in a set of compliance rules; and
rejecting the third value as the remedy for the problem.

11. The method of claim 1, wherein the problem is an accessibility problem in the user interface, the accessibility problem corresponding to an impairment of a user using the user interface.

12. The method of claim 1, wherein the problem is a usability problem in the user interface, the usability problem corresponding to usage condition in which the user interface is used.

13. The method of claim 1, wherein the attribute of the problem element specifies a color palette used in relation to the problem element.

14. The method of claim 1, further comprising:
determining whether applying the changed value to the attribute of the problem element complies with a second compliance rule,
wherein the second compliance rule evaluates compliance of a plurality of elements in the user interface,
wherein for the applying the changed value to be in compliance with the second compliance rule, each element in the plurality of elements must be in compliance with the second compliance rule, and
wherein the selecting, the associating, and the presenting are responsive to the applying the changed value to the attribute of the problem element being in compliance with the second compliance rule.

15. The method of claim 1,
determining whether applying the changed value to the attribute of the problem element complies with a second compliance rule,
wherein the second compliance rule evaluates compliance of a plurality of elements in the user interface, and
wherein for the applying the changed value to be in compliance with the second compliance rule, each element in the plurality of elements must be in compliance with the second compliance rule;
computing, responsive to the applying the changed value to the attribute of the problem element not being in compliance with the second compliance rule, a second changed value of the attribute of the problem element; and
replacing the changed value with the second changed value.

16. The method of claim 1, further comprising:
identifying the problem in the user interface using a description of the user interface, wherein the description comprises information about a set of elements used in the user interface, the set of elements including the problem element.

17. A computer usable program product comprising a computer readable storage device including computer usable code for resolving a problem in a user interface, the computer usable code when executed by a processor causing operations comprising:
analyzing the user interface to identify a problem element in the user interface, wherein the problem in the user interface is related to an initial value of an attribute of the problem element;

computing a changed value of the attribute of the problem element;

determining that the changed value satisfies a compliance rule applicable to the user interface;

selecting a first record and a second record from a historical data, wherein the first record includes a first value of a metric usable with the user interface, and wherein the second record includes a second value of the metric;

associating, with the changed value, a difference between the second value and the first value as an expected change in the metric due to the changed value;

presenting the changed value and the expected change in the metric as a remedy for the problem in the user interface, wherein the expected change includes a change in an input accuracy metric when the remedy is applied to the problem element; and applying, responsive to receiving an instruction to apply the remedy to the problem element, the changed value of the attribute as the remedy to the problem element.

18. The computer usable program product of claim 17, wherein the computer usable code is stored in a computer readable storage medium in a data processing system, and wherein the computer usable code is transferred over a network from a remote data processing system.

19. The computer usable program product of claim 17, wherein the computer usable code is stored in a computer readable storage medium in a server data processing system, and wherein the computer usable code is downloaded over a network to a remote data processing system for use in a computer readable storage medium associated with the remote data processing system.

20. A data processing system for resolving a problem in a user interface, the data processing system comprising:

a storage device including a storage medium, wherein the storage device stores computer usable program code; and a processor, wherein the processor executes the computer usable program code, and wherein the computer usable program code comprises:

computer usable code for analyzing the user interface to identify a problem element in the user interface, wherein the problem in the user interface is related to an initial value of an attribute of the problem element;

computer usable code for computing a changed value of the attribute of the problem element;

computer usable code for determining that the changed value satisfies a compliance rule applicable to the user interface;

computer usable code for selecting a first record and a second record from a historical data, wherein the first record includes a first value of a metric usable with the user interface, and wherein the second record includes a second value of the metric;

computer usable code for associating, with the changed value, a difference between the second value and the first value as an expected change in the metric due to the changed value;

computer usable code for presenting the changed value and the expected change in the metric as a remedy for the problem in the user interface, wherein the expected change includes a change in an input accuracy metric when the remedy is applied to the problem element; and applying, responsive to receiving an instruction to apply the remedy to the problem element, the changed value of the attribute as the remedy to the problem element.

\* \* \* \* \*